Oct. 1, 1968           P. MOLLARD           3,403,984

SODIUM PERBORATE AND PROCESS FOR PREPARATION OF SAME

Filed Feb. 16, 1966

INVENTOR.
PAUL MOLLARD
BY
Webb, Burden, Robinson & Webb

ATTORNEYS.

4,403,984
Patented Oct. 1, 1968

3,403,984
SODIUM PERBORATE AND PROCESS FOR
PREPARATION OF SAME
Paul Mollard, Sainte-Foy-les-Lyon, Rhone, France, assignor to Ugine Kuhlmann, Paris, France, a corporation of France
Filed Feb. 16, 1966, Ser. No. 527,884
Claims priority, application France, Feb. 17, 1965, 5,894
7 Claims. (Cl. 23—315)

ABSTRACT OF THE DISCLOSURE

A process for preparing a novel high strength hollow, unitary crystalline agglomerate perborate having an apparent density between 0.35–0.50 and an average diameter of 140–270μ by simultaneously introducing an aqueous sodium metaborate and a solution of hydrogen peroxide into a container, cooling the solution to below 5° C. to produce fine crystals that agglomerate. The agglomerates thus formed are introduced into a continuously formed supersaturated solution of sodium perborate, said agglomerates maintained as a fluid bed in suspension, to cause formation of the said high strength sodium perborate.

---

Figure 1:
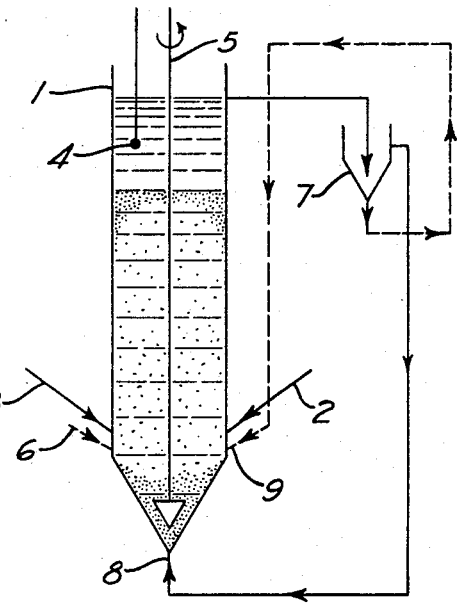

This invention relates to a hydrated sodium perborate product whose formula is:

$$NaBO_2 \cdot H_2O_2 \cdot 3H_2O$$

and whose grains and the shape thereof enjoy numerous industrial advantages, in particular a low apparent density coupled with an excellent strength. The grains may be produced within rather wide granulation limits and they are smooth enough so that they easily flow from hoppers.

The invention also relates to a process for the preparation of this product.

It is known that sodium perborate has a wide market in washing products wherein its composition plays an important part.

Now, perborates industrially prepared are not always satisfactory. Some of them have an apparent specific weight too high (0.65 to 0.85, i.e. 650 to 850 g./liter), compared to the other lye components; they gather at the bottom of the packages during transportation and handling, and subsequently the distribution of the diverse components of the washing product at the time of use is no longer that for which the washing product was made. On the other hand, other perborate products with lower apparent specific weights (0.25 to 0.50, i.e. 250 to 500 g./liter), have fragile grains and become dusts which disturb users during handling.

Sodium perborate in solution is generally obtained by combining a borate and an oxidizing agent, for instance sodium metaborate and hydrogen peroxide, or borax, sodium hydroxide and hydrogen peroxide, or borax, sodium peroxide and hydrogen peroxide. Various stabilizers are often added of which magnesium silicate is most generally used. From these solutions, wherein the perborate concentration is maintained at the desired value by introduction of perborate or of starting products, the perborate crystals precipitate. By regulation of the precipitation conditions, crystals of most various sizes and shapes may be obtained and the results are enhanced by use of various surface-active products such as adjuvants.

In general, numerous very fine crystals are formed from very concentrated solutions which are made supersaturated. Such effects may be modified by adjusting the medium temperature. When the temperature decreases, the supersaturation increases and, simultaneously, the growing kinetics of the crystals slows down; thus, very fine acicular or tabular nuclei are obtained which tend to gather into very porous fragile agglomerates.

This invention uses fragile agglomerates of fine crystals, hereunder named "initial agglomerates," and produces final agglomerates with enhanced solidity or strength coupled with a relatively low apparent density.

More specifically the invention comprises:

(1) A new hydrated sodium perborate product, which is light and endowed with a high strength, the grains of which are hollow inside and the wall or shell of which is formed of unitary crystals welded together by the product deposited on them, the apparent density of which is substantially 0.35–0.50, and the average diameter of which is substantially 140–270μ.

The strength has been determined by the attrition curve that indicates the average diameter of grains of the product relative to time, after testing in a standard sifting machine. The average diameter of the product according to the invention remains substantially constant.

(2) A process, preferably continuous, for the preparation of perborate, which comprises forming, in a preferably cylindro-conic crystallizer, provided with a stirring device, a suspension of perborate agglomerates previously prepared, by introducing in the cylinder a concentrated solution, by making said perborate solution supersaturated by introducing on the one hand hydrogen peroxide having a concentration of 27–75% by weight and on the other hand an aqueous solution of sodium metaborate containing 200–500 g./liter of $NaBO_2$, by introducing in said supersaturated solution a suspension of initial agglomerates prepared as hereunder described. The reagents are introduced in substantially stoichiometric quantities or with a small metaborate excess. The supersaturated solution blows upwardly through the crystallizer and maintains the agglomerates which form a fluid bed in suspension; the initial agglomerates cover with a layer of perborate which makes the grain more resistant and a higher density, whereas the inner remains hollow. The agglomerates go down as their density increases and the final agglomerates of the desired density are eliminated at the bottom of the crystallizer. The spent solution overflows at the top of the crystallizer and can carry away fine crystals or light grains; this solution is directed towards the bottom of the crystallizer.

The initial agglomerates are obtained by simultaneously and rapidly introducing into a suitable container an aqueous solution of sodium metaborate having a concentration of substantially 100–300 g./liter of $NaBO_2$, and a hydrogen peroxide solution at 15%–40% by weight concentration. Thereafter, the solution is cooled down; the sodium perborate precipitates in fine crystals which quickly agglomerate in fragile and very light agglomerates, here named "initial agglomerates."

These initial agglomerates are hollow, fragile, very light; their apparent density may vary from 0.15–0.30 g./cm.³ and their average diameter is between 120 and 400μ.

To prepare the initial agglomerates, it is preferable that the sodium metaborate concentration be between 100 and 240 g./liter and that the hydrogen peroxide preferably have a concentration between 20%–40% by weight. The reagents are used in stoichiometric quantities or with a small excess of $NaBO_2$. They are introduced simultaneously and very rapidly, for instance in a few seconds, into a container which afterwards is cooled down below +5° C. The resulting suspension is stirred for some time, for example 1–10 minutes, then introduced into the crystallizer where the final agglomerates according to the invention are formed.

These new sodium perborate final agglomerates of the invention are obtained within a rather wide granulation range which depends upon some factors which are examined hereafter.

It has been observed that to obtain sodium perborate product having a determined granulation together with a desired apparent density, it was necessary to maintain constant the ratio: weight of initial agglomerates/weight of final agglomerates. For the same purpose, it proved to be necessary to carefully regulate the frequency of introduction of the initial agglomerates into the fluid bed, according to the preferred continuous operating method hereabove indicated.

It has been observed that an excess of initial agglomerates in the fluid bed led to a rapid transformation of the initial agglomerates into aerated, flake-like and fragile grains, which are entrained upwardly by the flow of ascending liquid and which may be directed towards the crystallizer. Inversely, an insufficiency of initial agglomerates or a low frequency of introduction led to heavy and compact grains. Thus, with a fluid bed formed from initial agglomerates with an average diameter of 250$\mu$ and an average density of 0.20, in suspension in a solution made supersaturated by introducing hydrogen peroxide solution at 33% by weight and an aqueous sodium metaborate solution at 240 g./liter, it was observed that, with a ratio "weight of initial agglomerates/weight of final agglomerates" of about 1/3, and with an introduction of initial agglomerates every 15 minutes, the obtained final agglomerates had an average apparent density of 0.43–0.45 and an average diameter of 260–270$\mu$. With a ratio "weight of initial agglomerates/weight of final agglomerates" of 2/3, the obtained grains had an average apparent density of 0.35 g./cm.$^3$ for an average diameter of 140$\mu$, some big grains having been broken off before reaching the desired strength. Inversely, with a ratio "weight of initial agglomerates/weight of final agglomerates" of 1/6, and an introduction of initial agglomerates every 30 minutes, the obtained grains had an average apparent density above 0.5 g./cm.$^3$ for an average diameter of 250–260$\mu$.

It appeared that the stirring speed and the ascension speed as a whole were more important than each of them taken separately. Effectively, a high ascension speed together with a strong stirring ejects most of the fine crystals which should be very interesting for the crystallization. On the other hand, a slow ascension speed together with a moderate stirring leads to a packing of the bed which makes the big grains break off. Therefore, it is advisable to find for each apparatus size the better value for these both factors.

It is advantageous to introduce the initial agglomerates into the cylindrical part of the apparatus, below the reagents inlet, whereby the layer of grains moves regularly in the crystallizer.

The fine crystals which are sometimes entrained by the liquid flowing out of the upper part of the apparatus may be reintroduced at the bottom of the cylindrical part, contingently after decantation of the liquid.

By taking into consideration the various preceding factors, it is possible to obtain the sodium perborate product of the invention within rather wide limits of apparent density and granulation. The product preferred has an apparent density of substantially 0.35–0.50 and an average diameter of 140–270$\mu$. Such characteristics are obtained when the ratio "weight of initial agglomerates/weight of final agglomerates" varies between 1/6 to 2/3.

Lastly, a most interesting intrinsic quality of the new product is its high strength. A very good idea of this strength is obtained from an attrition curve of the product relative to time.

To establish this curve, a constant amount of the product to be tested is submitted to sifting for a variable time. The sample is placed on the upper screen of a standard Tyler series having a diameter of 200 mm. and the following mesh dimensions in microns:

| No. | |
|---|---|
| 35 | 420 |
| 48 | 297 |
| 65 | 210 |
| 100 | 149 |
| 150 | 105 |
| 300 | 53 |

The whole set of screens is jointly submitted to a horizontal alternative movement and to frequent vertical shocks by means of a standard Tyler sifting machine, called Ro-Tap.

A first sample is sifted for 5 minutes, a second sample for 15 minutes, a third for 30 minutes and a fourth for one hour.

Figure 2:
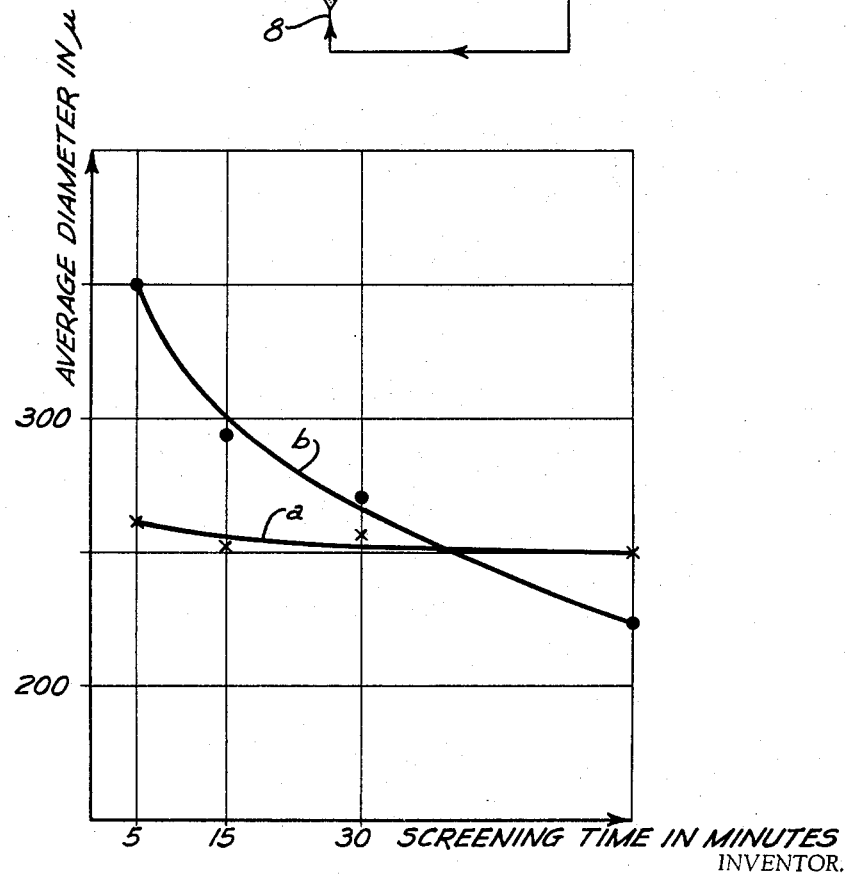

By tracing the granulation curve of each sample, its average diameter may be deduced (diameter corresponding to a cumulative oversize of 50%); the average diameter is brought in ordinates on a graphic (FIG. 2) where the abscissa are expressed in sifting time. The curve obtained by joining the representative points of the samples of a product is the attrition curve of this product. FIGURE 2 represents as an example the attrition curve of final agglomerates according to the invention (curve $a$) and the attrition curve of initial agglomerates (curve $b$) used to obtain the final agglomerates of curve $a$.

It can be seen that the final agglomerates according to the invention maintain an average grain-size practically constant, whereas the grain-size of the initial agglomerates lessens from 350$\mu$ to 225$\mu$ about.

The following non-limitative example illustrates the invention.

Example

This example describes the preparation of the initial agglomerates then the one of the agglomerates according to the invention.

Into a 0.6 liter cylindric vessel were simultaneously introduced, in 5 seconds, 180 cm.$^3$ of a NaBO$_2$ solution at 100 g./liter, and a hydrogen peroxide solution at 33% by weight. The solution remained clear. Then the vessel was plunged into a 3-liter Dewar vessel containing a mixture of carbon dioxide snow and acetone and having its temperature between $-5°$ C. and $-10°$ C. Thus, the temperature of the reaction mixture went rapidly down and, after about 3 minutes, the precipitation suddenly occurred. Then the temperature was near 2° C. The thick suspension obtained was stirred for 1 or 2 minutes to become homogeneous and more fluid.

The foregoing obtained a suspension of light sodium perborate agglomerates (initial agglomerates) formed of substantially spherical, hollow grains, with an apparent density of about 0.20 and an average diameter of 250$\mu$. A strong dispersion was observed around the latter value and the cumulative oversize at 80% corresponded to a diameter of 90 microns.

To prepare the final agglomerates according to the invention, the apparatus represented in FIGURE 1 was utilized. Into a 5 liter cylindro-conic crystallizer 1, provided with a stirrer 5, and 12 cm. in diameter and 50 cm. in height were introduced, through 8 a supersaturated sodium perborate solution, through line 2 hydrogen peroxide solution at 33% by weight, and, through line 3 a solution of NaBO$_2$ at 240 g./liter. The proportion of the reagents H$_2$O$_2$ and NaBO$_2$ was so determined that 100 g./h./l. of sodium perborate be deposited and that was always a NaBO$_2$ excess of 20 g./l. The temperature at area 4 was maintained at 20° C.

Through line 6, the suspension of initial agglomerates previously prepared, was introduced at the rate of 200 cm.$^3$ (40 g. perborate) every 15 minutes.

The liquid flowing out of the upper part of the crystallizer contained a portion of the fine crystals and was sent to a decanting device 7. The decanted liquid was reintroduced through line 8 at the rate of 4.5 liters/hour into the lower part of the apparatus while the recovered fine crystals were recycled by line 9. The ascension speed of the liquid in the crystallizer 1 was regulated at 3.5 m./hour.

Sodium perborate final agglomerates were collected and extracted from the bottom of the crystallizer having the desired shape and structure; their average diameter and their apparent density are shown hereunder:

| Time after starting (hr.) | Average diameter | Apparent density |
|---|---|---|
| 1¼ | 225 | 0.38 |
| 1¾ | 240 | 0.40 |
| 2¼ | 250 | 0.42 |
| 2¾ | 260 | 0.45 |
| 3½ | 260 | 0.45 |
| 4 | 270 | 0.45 |
| 4½ | 270 | 0.44 |

As it is seen, after about 2½ hours, the apparent density and the average granulation have values practically constant.

The curves drawn on FIGURE 2 indicate the comparative evolutions of the average diameter of the sodium perborate final agglomerates (curve $a$) and of the initial agglomerates (curve $b$), respectively produced and used in this example. To trace these curves, it has been used the test hereabove described and the final agglomerates removed after 4 hours in the crystallizer.

The hereunder table shows the values which have been used to trace the curves relative to the product obtained in this example.

| Time (min.) | Average diameter of initial agglomerates | Average diameter of final agglomerates |
|---|---|---|
| 5 | 350 | 264 |
| 15 | 290 | 254 |
| 30 | 271 | 256 |
| 60 | 225 | 250 |

While I have shown and described preferred embodiments of my invention, it may be otherwise embodied within the scope of the appended claims.

I claim:
1. A new hydrated sodium perborate product, which is light and endowed with a high strength, the grains of which are hollow inside and the wall or shell of which is formed of unitary crystals welded together, the apparent density of which is substantially 0.35–0.50, and the average diameter of which is substantially 140–270$\mu$.

2. The perborate of claim 1 wherein same has a general shape which simulates that of eggs.

3. A process for the preparation of sodium perborate comprising:
   (A) preparing an initial agglomerate by simultaneously and rapidly introducing an aqueous solution of sodium metaborate containing substantially 100–300 g./liter of $NaBO_2$ and a hydrogen peroxide solution of 15%–40% by weight concentration into a container, cooling the solution to below about 5° C. and precipitating fine crystals of sodium perborate that agglomerate to form said initial agglomerates;
   (B) introducing an aqueous solution of the initial agglomerates into a container through which a supersaturated solution of sodium perborate circulates, while maintaining the initial agglomerates in fluid suspension, said sodium perborate being maintained as a supersaturated solution by feeding into said container an aqueous hydrogen peroxide solution having a concentration of 27%–75% by weight and an aqueous solution of sodium metaborate containing 200–500 g./liter of $NaBO_2$.

4. The process of claim 3 wherein the ratio of the weight of initial agglomerates to the weight of final agglomerates produced is substantially between 1:6 and 2:3.

5. The process of claim 3 wherein a quantity of initial agglomerates is introduced into said container about every 15–30 minutes.

6. The process of claim 3 wherein after said precipitation of said initial agglomerates same are introduced into said container as an aqueous suspension which results from their preparation.

7. The process of claim 3 wherein said initial agglomerates are introduced into said container below that place where said hydrogen peroxide and said sodium metaborate solution are introduced into said container.

References Cited

UNITED STATES PATENTS 3,035,897   5/1962   Habernickel _____ 23—315

FOREIGN PATENTS 568,647   7/1958   Belgium.

OSCAR R. VERTIZ, *Primary Examiner.*

H. S. MILLER, *Assistant Examiner.*